US012561053B2

(12) United States Patent
Saito

(10) Patent No.: US 12,561,053 B2
(45) Date of Patent: Feb. 24, 2026

(54) INFORMATION PROCESSING DEVICE AND INFORMATION PROCESSING PROGRAM

(71) Applicant: FUJIFILM CORPORATION, Tokyo (JP)

(72) Inventor: Tomoaki Saito, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 178 days.

(21) Appl. No.: 18/254,879

(22) PCT Filed: Nov. 30, 2021

(86) PCT No.: PCT/JP2021/043959
§ 371 (c)(1),
(2) Date: May 29, 2023

(87) PCT Pub. No.: WO2022/114232
PCT Pub. Date: Jun. 2, 2022

(65) Prior Publication Data
US 2024/0012551 A1     Jan. 11, 2024

(30) Foreign Application Priority Data

Nov. 30, 2020   (JP) ................................. 2020-199120

(51) Int. Cl.
*G06F 3/04847*       (2022.01)
*G06F 3/0482*        (2013.01)
*G06F 3/0488*        (2022.01)

(52) U.S. Cl.
CPC ........ *G06F 3/04847* (2013.01); *G06F 3/0482* (2013.01); *G06F 3/0488* (2013.01); *G06F 2203/04803* (2013.01)

(58) Field of Classification Search
CPC ... G06F 3/0482; G06F 3/04847; G06F 3/0488
See application file for complete search history.

(56) References Cited

U.S. PATENT DOCUMENTS

2008/0022228 A1*   1/2008   Kwon ................. G06F 3/04817
                                                        715/810
2013/0219340 A1*   8/2013   Linge .................. G06F 3/04883
                                                        715/834

(Continued)

FOREIGN PATENT DOCUMENTS

JP        2010-154039 A       7/2010
JP        2011-043624 A       3/2011

(Continued)

OTHER PUBLICATIONS

English language translation of the following: Office action dated Apr. 23, 2024 from the JPO in a Japanese patent application No. 2020-199120 corresponding to the instant patent application. This office action translation is submitted now in order to supplement the understanding of the cited references which are being disclosed in the instant Information Disclosure Statement.

*Primary Examiner* — Seth A Silverman
(74) *Attorney, Agent, or Firm* — SOLARIS Intellectual Property Group, PLLC

(57)                    ABSTRACT

A display device includes a processor, in which the processor displays an operation element that is configured to receive an instruction of a process involving a setting set by a user on a display device, and when an operation is performed on a first region, included in a range in which the operation element is displayed, the processor executes the process by an operation of the shorter time than when an operation is performed on a second region, that is included in a range in which the operation element is displayed and is different from the first region.

10 Claims, 10 Drawing Sheets

(56)     References Cited

U.S. PATENT DOCUMENTS

| | | | | |
|---|---|---|---|---|
| 2014/0059486 A1* | 2/2014 | Sasaki | A61B 8/0866 | |
| | | | | 715/810 |
| 2014/0331164 A1 | 11/2014 | Enomoto et al. | | |
| 2015/0121298 A1* | 4/2015 | Ma | G06F 3/0485 | |
| | | | | 715/810 |
| 2015/0172487 A1 | 6/2015 | Kirihara et al. | | |
| 2015/0355789 A1* | 12/2015 | O'Mahony | G06F 3/0482 | |
| | | | | 715/810 |
| 2016/0018964 A1* | 1/2016 | Kamii | H04M 1/22 | |
| | | | | 345/173 |
| 2017/0147194 A1 | 5/2017 | Ishihara | | |
| 2018/0217797 A1* | 8/2018 | Inoue | H04N 1/00408 | |
| 2019/0098152 A1 | 3/2019 | Nakata et al. | | |
| 2019/0245989 A1 | 8/2019 | Yoshida | | |

FOREIGN PATENT DOCUMENTS

| | | |
|---|---|---|
| JP | 2013-012060 A | 1/2013 |
| JP | 5585683 B1 | 9/2014 |
| JP | 2015-032168 A | 2/2015 |
| JP | 2017-97496 A | 6/2017 |
| JP | 2018-144404 A | 9/2018 |
| JP | 2019-135814 A | 8/2019 |

* cited by examiner

Figure 3:
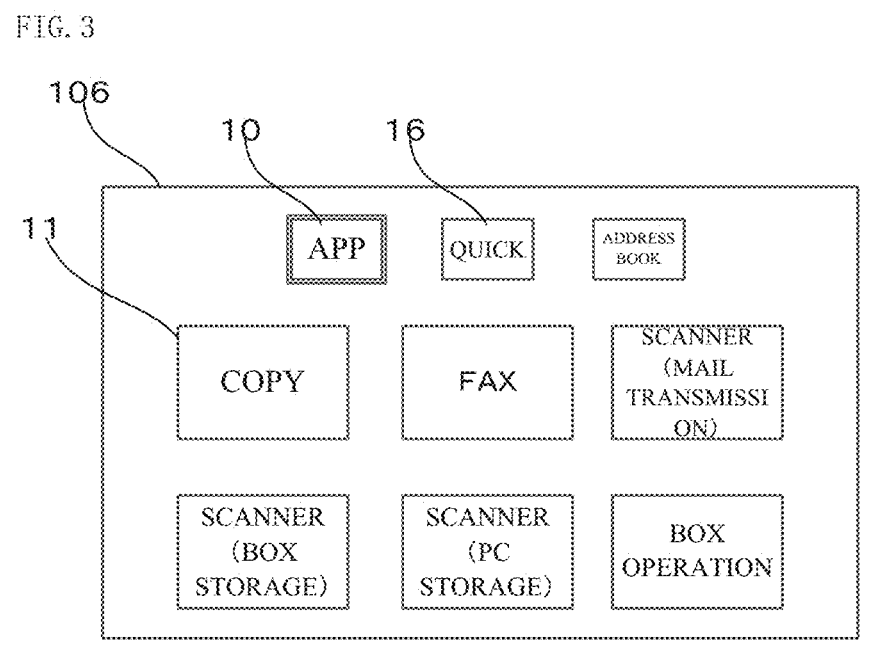

APP

QUICK

ADDRESS
BOOK

COPY

FAX

SCANNER
(MAIL
TRANSMISSI
ON)

SCANNER
(BOX
STORAGE)

SCANNER
(PC
STORAGE)

BOX
OPERATION

| COPY |
| --- |

| NUMBER OF COPIES<br>1 COPY |
| --- |
| COLOR MODE<br>MONOCHROME |
| MAGNIFICATION<br>100% |
| PAPER SELECTION<br>AUTOMATIC |

12

⇨

14a(14, 13)

INFORMATION PROCESSING DEVICE AND INFORMATION PROCESSING PROGRAM

TECHNICAL FIELD

The technology of the present disclosure relates to an information processing device and an information processing program.

BACKGROUND ART

Japanese Patent Application Laid-Open (JP-A) No. 2017-97496 discloses an electronic device including a touch operation unit. The electronic device includes: a selection unit that selects any of a plurality of functions as an execution target function; a measurement unit that measures a slide amount of a touch operation when the touch operation is executed on the touch operation unit; a function selected by the selection unit; a determination unit that determines whether or not the touch operation is effective as a slide operation in accordance with the slide amount of the touch operation measured by the measurement unit; and a control unit that controls the function selected by the selection unit when the determination unit determines that the touch operation is effective as the slide operation.

SUMMARY OF INVENTION

Technical Problem

There is an information processing device that receives a processing instruction in a case in which an operation element displayed on a display device is operated by an operation requiring a certain period of time, such as a slide operation. Since an operation such as a slide operation is more complicated than a simple operation such as a simple touch operation, it is difficult to unintentionally receive an instruction. In this regard, a time-consuming operation requires more input labor for the user than a simple operation.

An object of the technology of the present disclosure is to provide an information processing device and an information processing program capable of receiving an instruction to execute a process for a shorter time than in a case in which execution of all processes are received by a time-consuming operation.

Solution to Problem

An information processing device according to a first aspect includes a processor. The processor may display, on a display device, an operation element that is configured to receive an instruction of a process involving a setting set by a user. In a case in which a first region, included in a range in which the operation element is displayed, is operated, the process may be executed by an operation of a shorter time compared with a case in which a second region, that is a region different from the first region and included in the range in which the operation element is displayed, is operated.

In the information processing device according to a second aspect, the operation element may include a history operation element displayed on the display device by executing a process in a setting related to the process.

In the information processing device according to a third aspect, the operation element may include a pinned operation element that is pinned by an instruction from the user, to be distinguished from other history operation elements from a list of history operation elements displayed on the display device, by executing the process in a setting related to the process.

In the information processing device according to a fourth aspect, in a case in which a range, in which the history operation element is displayed, is operated, a restriction may be imposed so that the operation of the shorter time is not executable.

In the information processing device according to a fifth aspect, at a time of pinning, execution of an operation other than the operation of the shorter time even in a case in which the first region is operated, or execution of the operation of the shorter time even in a case in which the second region is operated, are be able to be set by an operation of the user.

In the information processing device according to a sixth aspect, the operation element may include an operation element displayed on the display device by a setting operation of the user before the process is executed.

In the information processing device according to a seventh aspect, in a case in which the first region is operated by the user and the process is executed by the operation of the shorter time, a setting screen on which the setting of the process is changeable need not be displayed on the display device.

In the information processing device according to an eighth aspect, even in a case in which the first region is operated, the process is executed by the operation of the case in which the second region has been operated, if the setting has been changed by a user operation on a setting screen on which the setting of the process is changeable, or on a setting screen that is different from the setting screen, before the process is executed by the operation of the shorter time.

An information processing program according to a ninth aspect causes a computer to function as the information processing device according to any one of the first to eighth aspects.

Advantageous Effects of Invention

According to the first aspect, there is an advantageous effect that a long-time operation is not required in accordance with an area to be operated, as compared with a case in which an execution instruction by a long-time operation is required for all execution operations.

According to the second aspect, there is an advantageous effect that a process can be executed by an operation of a shorter time in an operation which is based on a history of past execution.

According to the third aspect, there is an advantageous effect that a process can be executed by an operation of a shorter time in an operation which is based on a history pinned from a history of past execution.

According to the fourth aspect, there is an advantageous effect that a process can be executed by an operation of a shorter time in an operation based on a history pinned from a history of past execution, but a process by an operation of a shorter time can be prevented from being executed from an unpinned history.

According to the fifth aspect, there is an advantageous effect that in the machine setting of the information processing device, it is possible to set execution of an operation other than an operation of a shorter time even in a case in which an operation is executed on the first region or execution of an operation of a shorter time even in a case in which an operation is executed on the second region, so that it is possible to provide an information processing device that suits a user preference as compared with a case in which the setting is disabled.

According to the sixth aspect, there is an advantageous effect that, regardless of the history of past executions, a process by an operation of a shorter time can be executed by a user executing a setting operation in advance.

According to the seventh aspect, there is an advantageous effect that, in a case in which the process is executed by an operation of a shorter time, the setting cannot be changed, so that the process can be prevented from being executed due to an erroneous operation of a shorter time as compared with a case in which the setting can be changed.

According to the eighth aspect, there is an advantageous effect that, in a case in which the setting is changed, the process is executed not by the operation of the shorter time in a case in which the first region is operated but by the operation in a case in which the second region is operated, so that the process can be prevented from being executed by an erroneous operation of a shorter time.

According to the ninth aspect, it is possible to provide an information processing program capable of making a long-time operation unrequired in accordance with an area to be operated, as compared with a case in which an execution instruction by a long-time operation is required for all execution operations.

BRIEF DESCRIPTION OF DRAWINGS

FIG. 3 is an explanatory diagram illustrating an example of a display screen of a display unit according to the first embodiment of the invention.

FIG. 4 is an explanatory diagram illustrating an example of the display screen of the display unit according to the first embodiment of the invention.

DESCRIPTION OF EMBODIMENTS

First Embodiment

Figure 1:
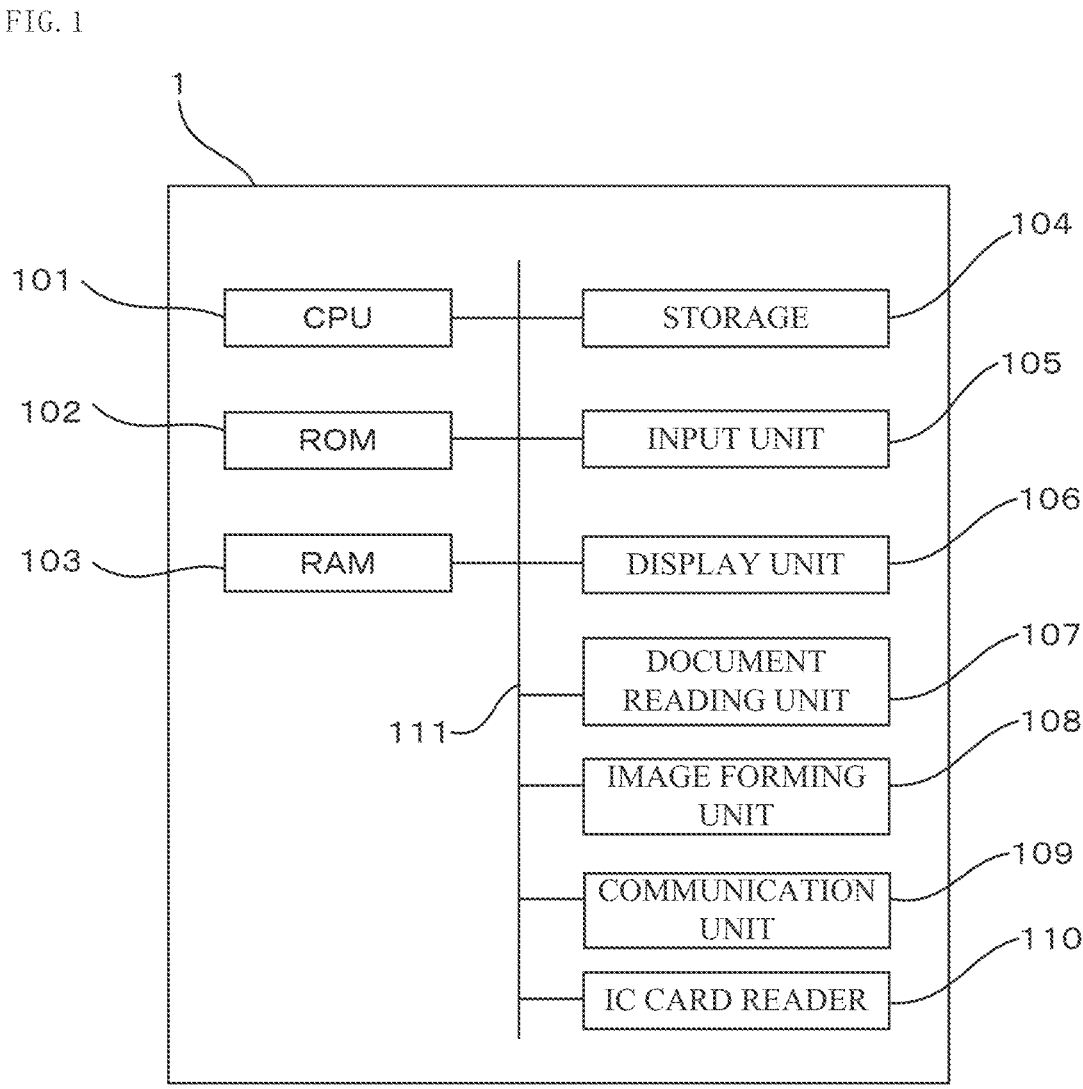
FIG. 1 is a schematic block diagram illustrating an image forming device according to a first embodiment of the present invention.

Hereinafter, an example of an embodiment of the present disclosure will be described with reference to the drawings.

In the drawings, the same or equivalent components and portions are denoted by the same reference numerals. Dimensional ratios in the drawings are exaggerated for facilitating description, and may be different from actual ratios.

FIG. 1 is a block diagram illustrating a hardware configuration of an image forming device 1 which is an example of an information processing device according to the embodiment.

Here, the image forming device 1 has various functions such as a copy function, a facsimile function, and a scanner function.

The information processing device is not limited to the image forming device 1.

As illustrated in FIG. 1, the image forming device 1 includes a central processing unit (CPU) 101 which is an example of a processor, a read-only memory (ROM) 102, a random access memory (RAM) 103, a storage 104, an input unit 105, a display unit 106, a document reading unit 107, an image forming unit 108, a communication unit 109, and an IC card reader 110. These components are communicatively connected to each other via a bus 111.

The CPU 101 is a central processing unit, and executes various programs and controls each unit. That is, the CPU 101 reads a program from the ROM 102 or the storage 104, and executes the program using the RAM 103 as a work area. The CPU 101 executes control of each of the above-described configurations and various arithmetic processes in accordance with programs recorded in the ROM 102 or the storage 104. In the embodiment, a program is stored in the ROM 102 or the storage 104.

The ROM 102 stores various programs and various types of data. The RAM 103 temporarily stores programs or data as a work area. The storage 104 includes a hard disk drive (HDD) or a solid state drive (SSD), and stores various programs including an operating system and various types of data.

When the user executes a process of a function of the image forming device 1, setting information of the executed function is stored as a history in the storage 104. As will be described below, when the user selects a quick icon 16, the history is displayed as a history operation element 17 on the display unit 106 (see FIG. 5). A predetermined number of histories, for example, 20 histories, can be stored. When the number of histories exceeds, for example, 20, the histories are deleted from the histories of the oldest date and time. Here, the setting information to be set varies depending on a function executed by the image forming device 1. In the case of "copy", examples of the setting information include information such as the number of copies, a color mode, magnification, N-up, and a density. In the case of "FAX", examples of the setting information include information such as a destination and a density.

Figure 5:
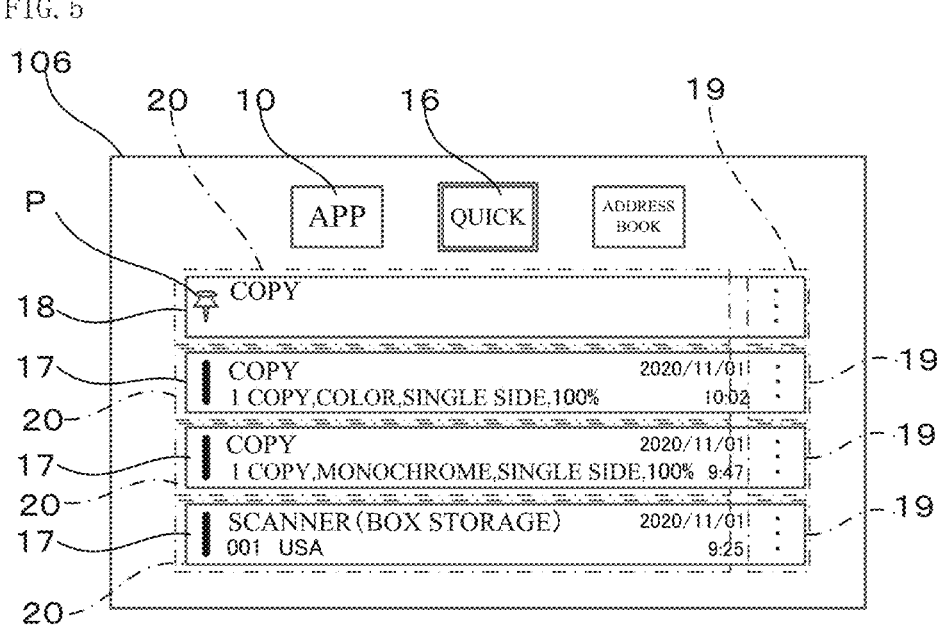
FIG. 5 is an explanatory diagram illustrating an example of the display screen of the display unit according to the first embodiment of the invention.

From a list of the histories stored by executing processes of functions of the image forming device 1, pinned setting information to be distinguished from other histories by an instruction from the user is stored. As will be described below, the pinned setting information is displayed as a pinned operation element 18 on the display unit 106 in a case in which the quick icon 16 is selected by the user (see FIG. 5). The pinned setting information is stored until the user executes a deletion operation. Here, in a case in which the pinned setting information is displayed as the pinned operation element 18 on the display unit 106, in the embodiment, an image P of "pin" is displayed as illustrated in FIG. 5, and can be distinguished from the history. By operating a long pressing operation on history operation element 17, a pinned menu is displayed to enable pinning, or a pinned menu is displayed in a menu in a case in which a first region 19 (a region where three "." are displayed in the vertical direction illustrated in FIG. 5) of history operation element 17 is operated to enable pinning. Any type of pinning method by the user can be used.

The setting information does not depend on the history stored when the function is executed by the user. Even before the function of the image forming device 1 is executed, it may be possible to store information set in advance on the setting screen through a setting operation of the user. Even in this case, similarly to the above-described pinned operation element 18, it is desirable that the image P of the "pin" is displayed and can be distinguished from the history. In the embodiment, description will be made on the assumption that the image P is included in the above-described pinned operation element 18. This case is not limited to a case in which the image P of "pin" similar to that of the pinned operation element 18 is displayed, and another image may be used.

The input unit 105 includes a pointing device such as a mouse and a keyboard and is used to execute various inputs. The input unit 105 is used to set setting information on a setting screen, execute a function, and the like, as described below. In the embodiment, the touch panel type display unit 106 functions as the input unit 105.

The display unit 106 is an example of a display device and is, for example, a liquid crystal display. The display unit 106 displays various types of information under the control of the CPU 101. A specific display example will be described below. The display unit 106 also functions as the input unit 105 by adopting a touch panel system.

The document reading unit 107 captures documents one by one placed on a sheet feeding table of an automatic feeding device (not illustrated) provided in an upper portion of the image forming device 1, and optically reads the captured documents to obtain image information. Alternatively, the document reading unit 107 optically reads a document placed on a table such as a platen glass to obtain image information.

Here, the image information of the document read by the document reading unit 107 is stored in the storage 104 of the image forming device 1, is printed by the image forming unit 108 to be described below, or is transmitted to another image forming device that has a facsimile (FAX) function by the communication unit 109 to be described below.

The image forming unit 108 forms, that is, prints, an image which is based on image information obtained by reading by the document reading unit 107 or image information obtained from a personal computer (PC) or the like connected via a network (not illustrated) on a recording medium such as a paper sheet.

The communication unit 109 connects the image forming device 1 to a public line, and transmits and receives image information obtained through reading by the document reading unit 107 to and from another image forming device that has a FAX function.

The communication unit 109 may communicate with another device such as a server device (not illustrated) according to a standard such as a public line, the Internet, an intranet, Ethernet (registered trademark), FDDI, or Wi-Fi (registered trademark).

The IC card reader 110 is a unit that reads information stored in an integrated circuit (IC) card, for example, a user ID. Then, after the IC card reader 110 reads the information stored in the IC card and identifies the user, the function of the image forming device 1 can be executed. After the function of the image forming device 1 is executed, the executed process is stored as a history for each user, as described above, in the storage 104.

As the premise, an IC card in which a user ID or the like is stored as user information needs to be distributed to the user of the image forming device 1.

The invention is not limited to the case in which a user is specified by causing the IC card reader 110 to read the IC card, and the user may specify the user to use by inputting his or her ID using the input unit 105 without using the IC card reader 110. Alternatively, the user information may be registered in advance in the image forming device 1, a list of registered user information may be called and displayed on the display unit 106, and the user to use may be specified by selecting his or her user information from the user information displayed on the display unit 106.

Without specifying the user who uses the image forming device 1, the history and the pinning to be described below may be common to all users. That is, in a case in which all the users use the common history or pinning setting and it is not necessary to store the history or the pinning for each user, it is not necessary to specify the user to use. Therefore, the IC card reader 110 or the like may not be provided.

Next, operational effects of the image forming device 1 will be described.

Figure 2:
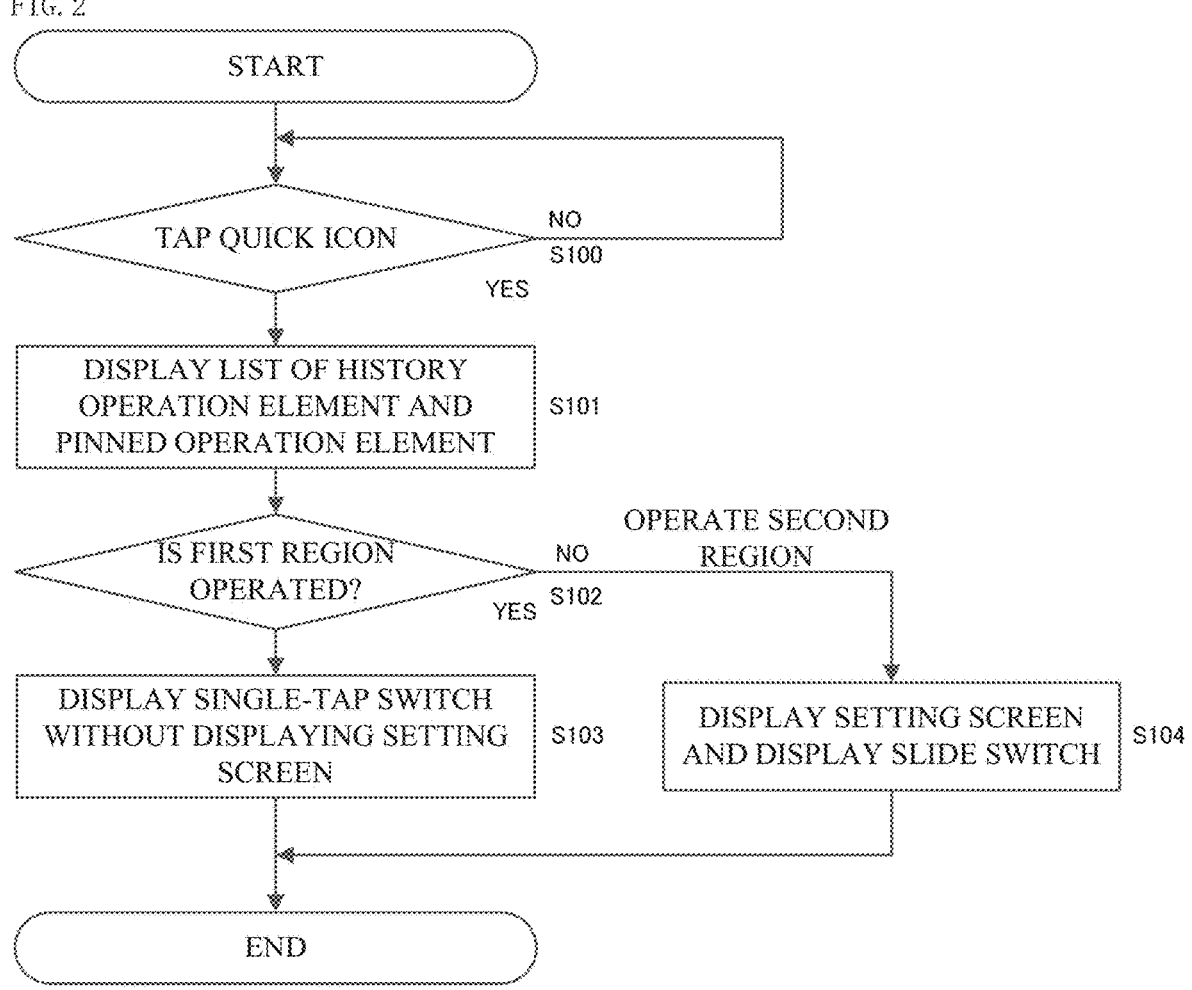
FIG. 2 is a flowchart illustrating an example of an operation of the information processing device according to the first embodiment of the invention.

FIG. 2 is a flowchart illustrating an example of an operation of the image forming device 1 in a case in which the process of the function is executed using the history operation element 17 and the pinned operation element 18.

As illustrated in FIG. 2, in step S100, the CPU 101 of the image forming device 1 determines whether or not the user has selected (tapped) the quick icon 16 (see FIG. 3) displayed on the display screen of the display unit 106 using the input unit 105 of the image forming device 1. In a case in which it is determined that the quick icon 16 has been selected, the process proceeds to the next step S101. In a case in which it is not determined that the quick icon 16 has been selected, the process proceeds to step S100 again.

Here, in a case in which the function of the image forming device 1 is executed without selecting the quick icon 16, for example, as illustrated in FIG. 3, when the application icon 10 displayed on the display screen of the display unit 106 is selected, an icon indicating the function of the image forming device 1 is displayed on the display screen of the display unit 106. Then, when the user selects any of the icons, for example, the copy icon 11, a setting screen on which setting information regarding the function associated with the selected icon can be set is displayed as illustrated in FIG. 4. In this example, the setting operation element 12 in which the number of copies, a color mode, magnification, paper selection, and the like can be set is displayed. For example, in a case in which the number of copies is changed from an initial setting "1 copy" in the setting information, the user selects the setting operation element 12 of the "number of copies" to set "2 copies" or "3 copies". Then, "copy" is executed by operating the execution switch 13 displayed in the lower right of the display screen of the display unit 106. Through the execution, the setting information is stored as a history in the storage 104. Here, the execution switch 13 is the slide switch 14 in which the process is executed by swiping an arrow portion 14a rightward by a predetermined distance. The reason why the swiping operation is executed on the slide switch 14 in this way is that, when the process is executed by a single-tap operation of selecting (tapping) the execution switch 13 once, there may be a problem that, in a case in which the switch is erroneously operated, an unintended billing function is used, or a FAX is sent to an unintended destination, which causes a security problem. In addition, the execution switch 13 displayed on the display screen of the display unit 106 from the selection of the application icon 10 is the same as the execution switch 13 displayed on the display screen of the display unit 106 by selecting a second region to be described below.

In step S101, the CPU 101 of the image forming device 1 displays a list of the history operation elements 17 and the pinned operation element 18 as operation elements on the display screen of the display unit 106, as illustrated in FIG. 5. Here, as illustrated in FIG. 5, each operation element is displayed in a strip form in the horizontal direction on the display screen of the display unit 106. Then, the process proceeds to the next step S102. As illustrated in FIG. 5, the operation element to be displayed displays the pinned operation element 18 stored in the storage 104 on the upper side, and the history operation element 17 is displayed below the pinned operation element 18 in chronological order. The order of the operation elements to be displayed is not limited to the order as illustrated in FIG. 5. For example, the history operation element 17 may be displayed above the pinned operation element 18. For operation elements to be displayed, as illustrated in FIG. 5, a mixture of the functions of the image forming device 1 is displayed. For example, a list is illustrated without distinguishing "Copy", "Scanner (box storage), and "FAX" from each other. However, may be invention is not limited thereto, and the operation elements may be displayed separately for each function of the image forming device 1. For example, only the history operation element 17 and the pinned operation element 18 related to "Copy" may be collectively displayed, then the history operation elements 17 and the pinned operation element 18 related to "Scanner (box storage)" may be displayed as a list, and then the history operation element 17 and the pinned operation element 18 related to "FAX" are displayed.

In step S102, the CPU 101 of the image forming device 1 determines whether the first region 19 (a region in which three "·" are displayed in the vertical direction illustrated in FIG. 5) included in the range in which the history operation element 17 and the pinned operation element 18 are displayed is operated or a second region 20 (a region of the operation element other than the region in which three "·" are displayed in the vertical direction illustrated in FIG. 5) is operated. In a case in which it is determined that the first region 19 has been operated, the process proceeds to the next step S103. Conversely, when it is determined that the first region 19 has not been operated and the second region 20 has been operated, the process proceeds to step S104. The operation on the first region 19 and the second region 20 includes, for example, a single-tap operation.

Figure 6:
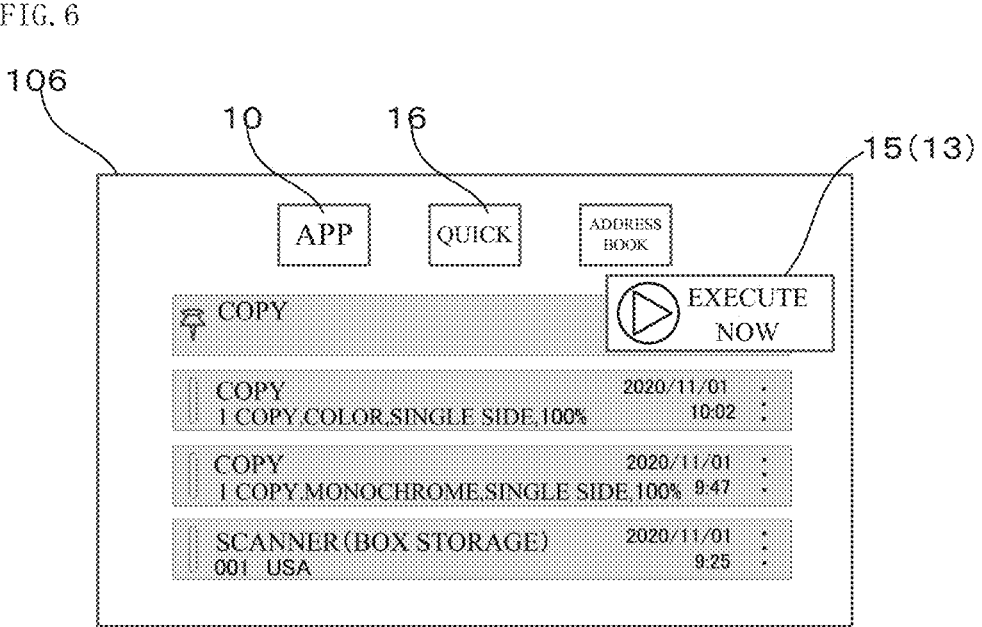
FIG. 6 is an explanatory diagram illustrating an example of a display screen of the display unit according to the first embodiment of the invention.

In step S103, the CPU 101 of the image forming device 1 does not display the setting screen in which the stored setting is displayed on the display screen of the display unit 106 as illustrated in FIG. 4, and displays, as the execution switch 13, a single-tap switch 15 for executing a process by selecting (tapping) the execution switch 13 once. That is, as illustrated in FIG. 6, when "Execute now" is displayed as the execution switch 13 and the user executes a single tap of "Execute now," the function of the image forming device 1 to which the operation element in which the first region 19 is operated corresponds, for example, "Copy" is executed. Here, the single tap is an operation of executing a process of a function of the image forming device 1 by an operation of a shorter time than swiping. In FIG. 6, the list of history operation element 17 and pinned operation element 18 is grayed out, which indicates that "Execute now" which is execution switch 13 can be operated. The reason why the process is executed by the single-tap operation instead of the swiping operation in a case in which the process is executed from the history operation element 17 or the pinned operation element 18 is that even in a case in which the execution switch 13 is erroneously operated when the process has been executed in the past, a security problem is less likely to occur. Then, the process ends. The operation of the shorter time is an operation in which the user can complete in a shorter time than a comparison target operation. For example, the single tap can complete the operation of the shorter time because the user does not slide with his or her finger as compared with the swiping. Since the tap operation is executed once less than the double tap, the operation can be completed in a short time.

In a case in which the first region 19 is operated and the process is executed by the single tap which is an operation of a shorter time, the setting screen in which the setting is displayed is not displayed on the display screen of the display unit 106, and the setting is made unchangeable. However, the invention is not limited thereto. The setting screen as illustrated in FIG. 4 or a setting screen different from the setting screen as illustrated in FIG. 4 displayed by displaying a "setting change" switch side by side with the single-tap switch 15 and operating the "setting change" switch may be displayed. In a case in which the user changes the setting, the process may be executed by a swiping operation which is an operation in a case in which the user operates the second region 20 instead of an operation of a shorter time. In addition, when the first region 19 is operated, the process of the function of the image forming device 1 may be executed without displaying the execution switch 13 such as "Execute now".

In step S104, as illustrated in FIG. 4, the CPU 101 of the image forming device 1 displays a setting screen in which the stored setting is displayed on the display screen of the display unit 106, and displays, as the execution switch 13, the slide switch 14 on which the process is executed by swiping the arrow portion 14a rightward by a predetermined distance. The execution switch 13 is not limited to the slide switch 14 in which the process is executed by swiping the arrow portion 14a rightward. As long as the operation is an operation in which it takes more time than a single tap and which is complicated, the operation may be a drag operation of moving the arrow portion 14a to another place, a long pressing operation of keeping the operation element pressed for a long time, a double tap operation of selecting (tapping) the execution switch 13 twice, or the like. Then, the process ends.

In each of the above embodiments, the aspect in which a program of a collection destination specifying process is stored (installed) in advance in the ROM 102 or the storage unit (storage) 104 has been described, but the invention is not limited thereto. The program may be provided in a form of being recorded in a recording medium such as a compact disk read only memory (CD-ROM), a digital versatile disk read only memory (DVD-ROM), or a universal serial bus (USB) memory. The program may be downloaded from an external device via a network.

Modified Example

The invention is not limited to the above-described first embodiment and various modifications and applications can be made without departing from the gist of the invention.

A first modified example will be described. In the above-described first embodiment, in a case in which the first region 19 is not operated and the second region 20 is operated, the slide switch 14 is swiped as the execution switch 13. However, even in a case in which the first region 19 is operated, the execution switch 13 may be set to execute a process by a swiping operation instead of a single-tap operation which is an operation of a shorter time. Even in a case in which the second region 20 is operated, the execution switch 13 may be set to execute a process by a single-tap operation which is an operation of a shorter time according to a machine setting of the image forming device 1.

Furthermore, a second modified example will be described. In the above-described embodiment, in a case in which the first region 19 is not operated and the second region 20 is operated, the swiping operation is executed on the slide switch 14. However, in a case in which the setting is not changed, the single tap operation may be executed. In a case in which the setting is changed, that is, in a case in which the number of copies, the magnification, or the like is changed, the swiping operation may be executed. In this case, since the setting is not changed even if the second region 20 is operated, a single-tap operation which is an operation of a shorter time similar to the case in which the first region 19 is operated is enabled to achieve convenience for the user.

Figure 7:
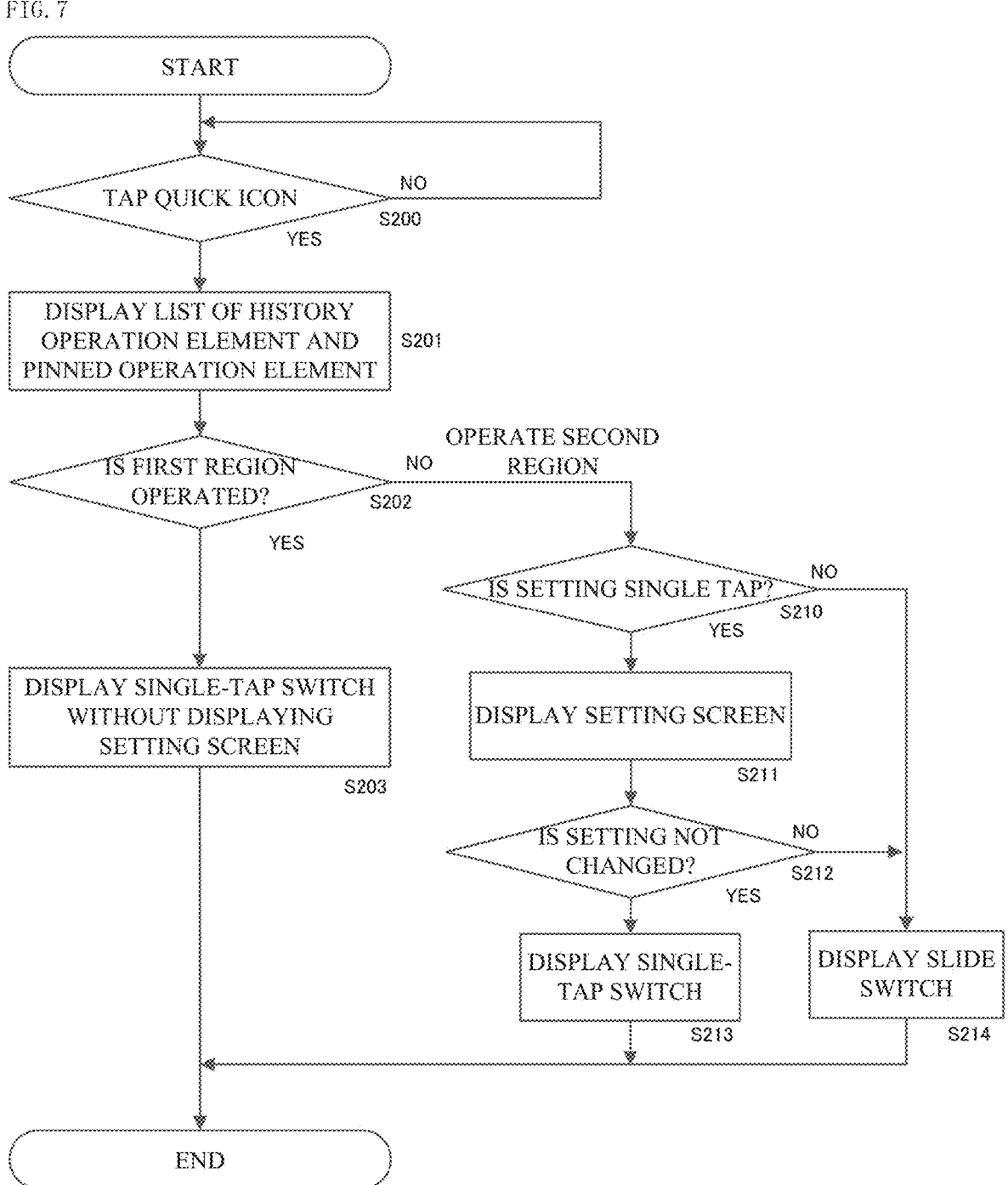
FIG. 7 is a flowchart illustrating an example of an operation of an information processing device according to a modified example of the first embodiment of the invention.

FIG. 7 illustrates a flowchart in which the first modified example and a second modified example in which execution of a process by a single-tap operation is set in accordance with a machine setting of the image forming device 1 are adopted even in a case in which the second region 20 is operated in the above-described first modified example.

As illustrated in FIG. 7, in step S200, the CPU 101 of the image forming device 1 determines whether or not the user has selected (tapped) the quick icon 16 using the input unit 105 of the image forming device 1. In a case in which it is determined that the quick icon 16 has been selected, the process proceeds to the next step S201. In a case in which it is not determined that the quick icon 16 has been selected, the process proceeds to step S200 again.

In step S201, as illustrated in FIG. 5, the history operation element 17 and the pinned operation element 18 are displayed as operation elements on the display screen of the display unit 106 by the CPU 101 of the image forming device 1. Then, the process proceeds to the next step S202.

In step S202, the CPU 101 of the image forming device 1 determines whether the first region 19 included in the range in which the history operation element 17 and the pinned operation element 18 are displayed has been operated or the second region 20 has been operated. When it is determined that the first region 19 has been operated, the process proceeds to the next step S203. Conversely, when it is determined that the first region 19 has not been operated and the second region 20 has been operated, the process proceeds to step S210. The operation on the first region 19 and the second region 20 includes, for example, a single-tap operation.

In step S203, the CPU 101 of the image forming device 1 does not display the setting screen in which the stored setting is displayed on the display screen of the display unit 106 as illustrated in FIG. 4, and displays, as the execution switch 13, the single-tap switch 15 for executing the process by selecting (tapping) the execution switch 13 once. That is, as illustrated in FIG. 6, when "Execute now" is displayed as the execution switch 13 and the user executes a single tap of "Execute now," the function of the image forming device 1 to which the operation element in which the first region 19 is operated corresponds, for example, "Copy" is executed. Here, the single tap is an operation of executing a process of a function of the image forming device 1 by an operation of a shorter time than swiping. In FIG. 6, the list of history operation element 17 and pinned operation element 18 is grayed out, which indicates that "Execute now" which is execution switch 13 can be operated. Then, the process ends.

In step S210, as in the above-described first modified example, it is determined whether or not the setting is a single-tap operation. In a case in which it is determined that the setting is the single-tap operation, the process proceeds to the next step S211. In a case in which it is determined that the setting is not the single-tap operation, that is, in a case in which the setting is the swiping operation, the process proceeds to step S214.

In step S211, the setting screen is displayed on the display screen of the display unit 106. Then, the process proceeds to the next step S212.

In step S212, it is determined whether or not the setting has been changed by the user. In a case in which it is determined that the setting is not changed by the user, the process proceeds to the next step S213. In a case in which it is determined that the setting is changed by the user, the process proceeds to step S214.

Figure 8:
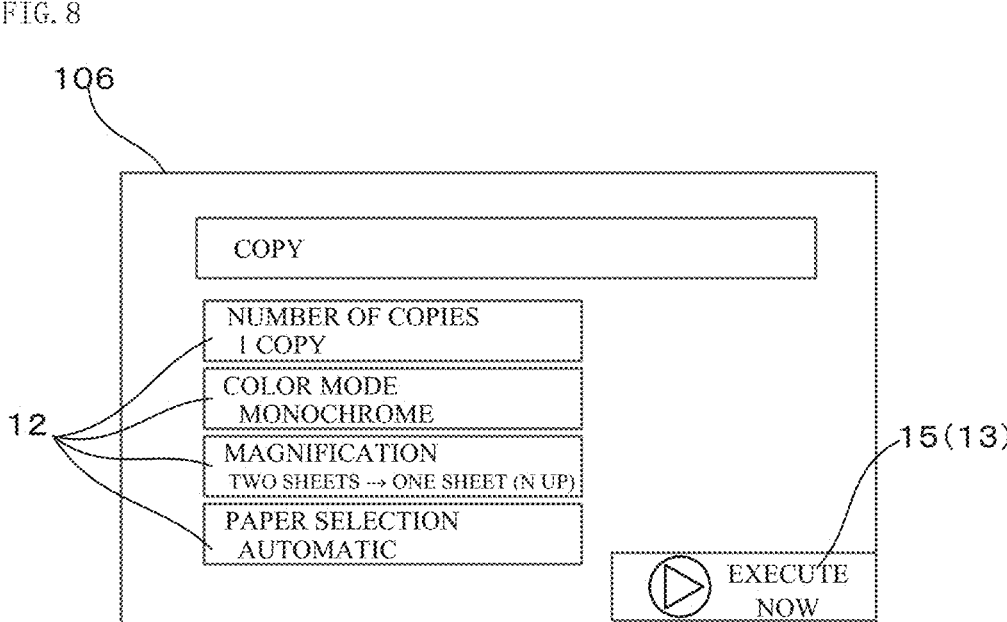
FIG. 8 is an explanatory diagram illustrating an example of a display screen of a display unit according to a modified example of the first embodiment of the invention.

In step S213, as illustrated in FIG. 8, the single-tap switch 15 is displayed on the display screen of the display unit 106. Here, in FIG. 8, for example, it is displayed that the "magnification" has been changed from "100%" to "two sheets→one sheet (N up)". Then, the process ends.

In step S214, as illustrated in FIG. 4, the setting screen is displayed on the display screen of the display unit 106, and the slide switch 14 is displayed. Then, the process ends.

Although the description has been given using the flowchart in which the two modified examples are adopted, only one of the modified examples may be adopted. In a case in which only the first modified example is adopted, step S211 and step S212 are omitted from the flowchart of FIG. 7, and the process proceeds to step S213 after step S210. In a case in which only the second modified example is adopted, step S210 is omitted from the flowchart of FIG. 7, and step S211 is executed after step S202.

Second Embodiment

Next, a second embodiment will be described.

In the above-described first embodiment, a single-tap operation which is an operation of a shorter time can be executed by selecting the first region 19 from both the history operation element 17 and the pinned operation element 18. In the second embodiment, the history operation element 17 is limited so that the single-tap operation which is an operation of a shorter time cannot be executed even if the first region 19 is selected. Only in the case of the pinned operation element 18, the first region 19 is selected so that the operation of the shorter time can be executed.

Here, portions different from those of the above-described first embodiment will be mainly described, and description of the repeated portions will be simplified or omitted.

Figure 9:
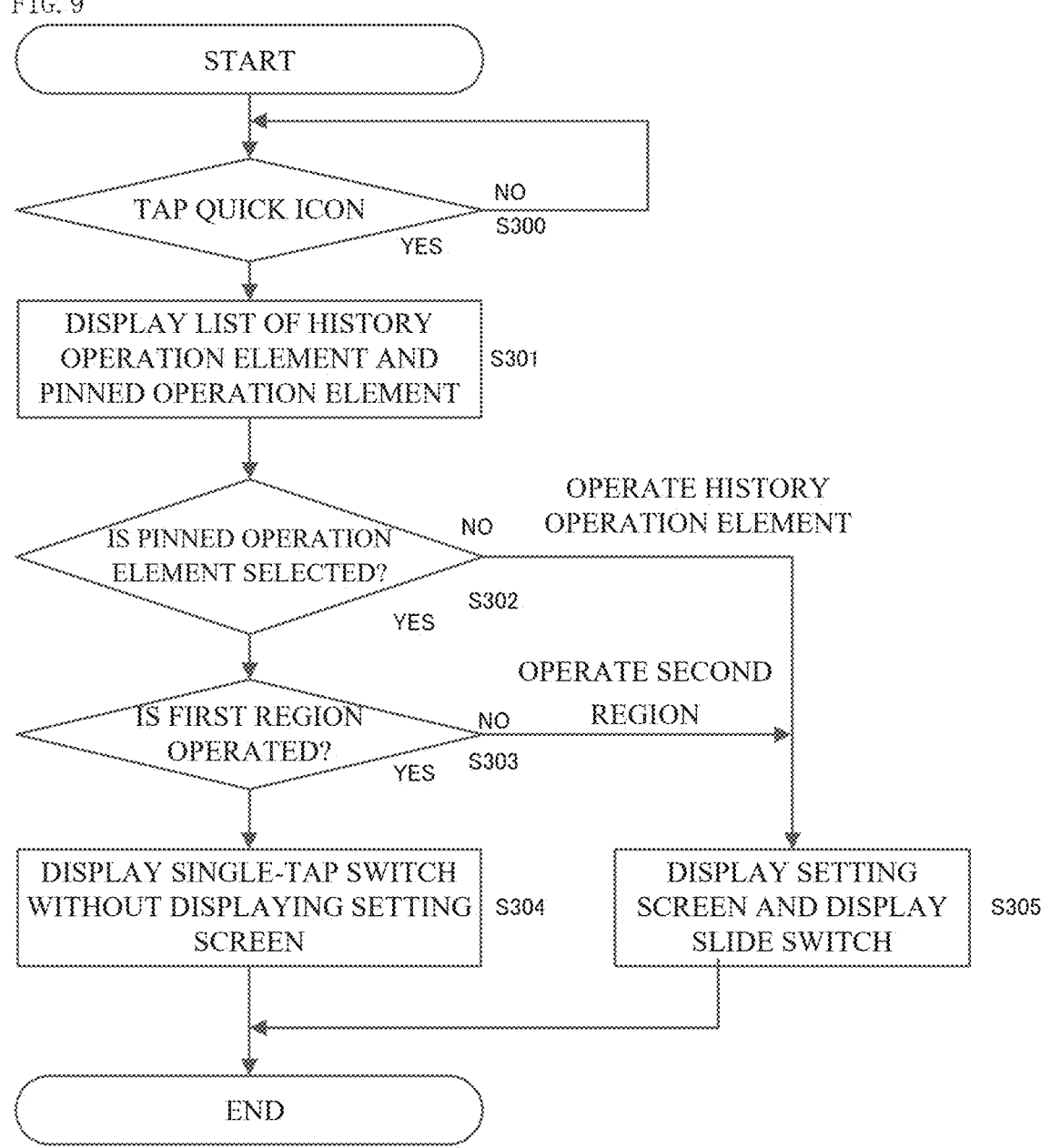
FIG. 9 is a flowchart illustrating an example of an operation of the information processing device according to a second embodiment of the invention.

FIG. 9 is a flowchart illustrating an example of the operation of the image forming device 1 in a case in which the process of the function is executed using the history operation element 17 and the pinned operation element 18.

In step S300, the CPU 101 of the image forming device 1 determines whether or not the user has selected (tapped) the quick icon 16 using the input unit 105 of the image forming device 1. In a case in which it is determined that the quick icon 16 has been selected, the process proceeds to the next step S301. In a case in which it is not determined that the quick icon 16 has been selected, the process proceeds to step S300 again.

In step S301, as illustrated in FIG. 5, the history operation element 17 and the pinned operation element 18 are displayed as operation elements on the display screen of the display unit 106 by the CPU 101 of the image forming device 1. Then, the process proceeds to the next step S302.

In step S302, it is determined whether or not the pinned operation element 18 has been operated. In a case in which it is determined that pinned operation element 18 has been operated, the process proceeds to next step S303. Conversely, in a case in which it is not determined that pinned operation element 18 has been operated, that is, in a case in which it is determined that history operation element 17 has been operated, the process proceeds to step S305.

In step S303, the CPU 101 of the image forming device 1 determines whether the first region 19 included in the range in which the pinned operation element 18 is displayed has been operated or the second region 20 has been operated. In a case in which it is determined that the first region 19 has been operated, the process proceeds to the next step S303. Conversely, in a case in which it is determined that the first region 19 has not been operated and the second region 20 has been operated, the process proceeds to step S305. The operation on the first region 19 and the second region 20 includes, for example, a single-tap operation.

In step S304, the CPU 101 of the image forming device 1 does not display the setting screen in which the stored setting is displayed on the display screen of the display unit 106 as illustrated in FIG. 4, and displays, as the execution switch 13, the single-tap switch 15 for executing the process by selecting (tapping) the execution switch 13 once. That is, as illustrated in FIG. 6, when "Execute now" is displayed as the execution switch 13 and the user executes a single tap of "Execute now," the function of the image forming device 1 to which the operation element in which the first region 19 is operated corresponds, for example, "Copy" is executed. Here, the single tap is an operation of executing a process of a function of the image forming device 1 by an operation of a shorter time than swiping. In FIG. 6, the list of history operation element 17 and pinned operation element 18 is grayed out, which indicates that "Execute now" which is execution switch 13 can be operated. Then, the process ends.

In step S305, as illustrated in FIG. 4, the CPU 101 of the image forming device 1 displays a setting screen in which the stored setting is displayed on the display screen of the display unit 106, and displays, as the execution switch 13, the slide switch 14 on which the process is executed by swiping the arrow portion 14a rightward by a predetermined distance. Therefore, when the history operation element 17 is operated, a single-tap operation which is an operation of a shorter time is inhibited from being executed. That is, as compared with the first embodiment in which the process can be executed by the single-tap operation simply based on the history of the past executions, by further requiring an intention of the pinning operation of the user, a possibility of a security problem occurring when the execution switch 13 is erroneously operated is further reduced. The execution switch 13 is not limited to the slide switch 14 in which the process is executed by swiping the arrow portion 14a rightward. As long as the operation is an operation in which it takes more time than a single tap and which is complicated, the operation may be a drag operation of moving the arrow portion 14a to another place, a long pressing operation of keeping the operation element pressed for a long time, a double tap operation of selecting (tapping) the execution switch 13 twice, or the like. Then, the process ends.

It may be determined whether the first region 19 of the pinned operation element 18 is selected or the other region (the second region 20 of the pinned operation element 18, the first region 19 of the history operation element 17, or the second region 20) is selected in one step without separating the above-described steps S302 and S303.

Modified Example

The invention is not limited to the above-described second embodiment, and various modifications and applications can be made without departing from the gist of the invention.

That is, the modified example of the first embodiment described above can also be applied to the second embodiment.

Figure 10:
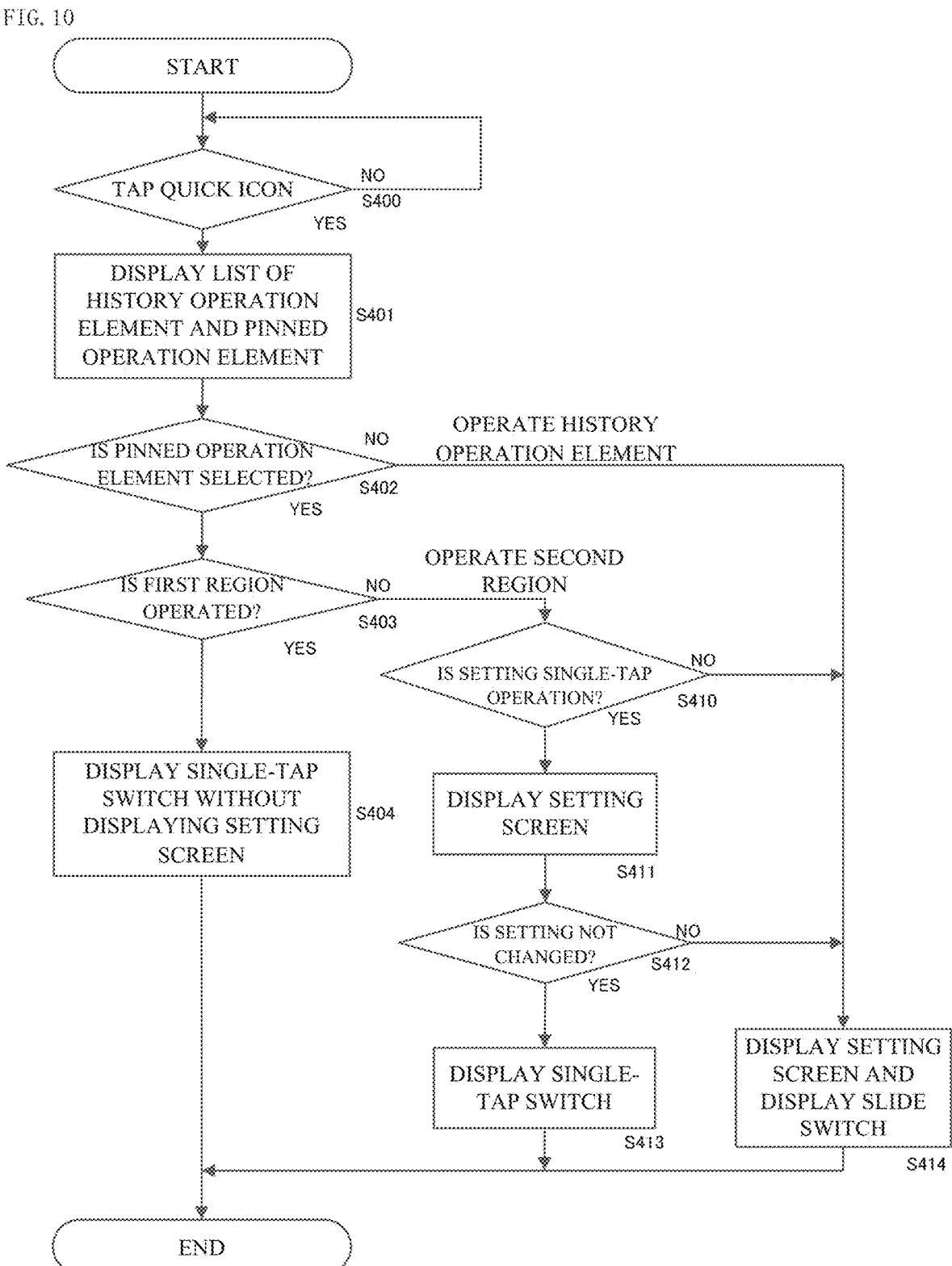
FIG. 10 is a flowchart illustrating an example of an operation of an information processing device according to a modified example of the second embodiment of the invention.

FIG. 10 illustrates a flowchart in which, in the first modified example of the first embodiment described above, the first modified example and the second modified example in which the execution of the process by the single-tap operation is set by the machine setting of the image forming device 1 even in a case in which the second region 20 is operated are applied to the second embodiment.

As illustrated in FIG. 10, in step S400, the CPU 101 of the image forming device 1 determines whether or not the user has selected (tapped) the quick icon 16 using the input unit 105 of the image forming device 1. In a case in which it is determined that the quick icon 16 has been selected, the process proceeds to the next step S401. In a case in which it is not determined that the quick icon 16 has been selected, the process proceeds to step S400 again.

In step S401, as illustrated in FIG. 5, the history operation element 17 and the pinned operation element 18 are displayed as operation elements on the display screen of the display unit 106 by the CPU 101 of the image forming device 1. Then, the process proceeds to the next step S402.

In step S402, it is determined whether or not the pinned operation element 18 has been operated. In a case in which it is determined that pinned operation element 18 has been operated, the process proceeds to next step S403. Conversely, in a case in which it is not determined that pinned operation element 18 has been operated, that is, in a case in which it is determined that history operation element 17 has been operated, the process proceeds to step S414.

In step S403, the CPU 101 of the image forming device 1 determines whether the first region 19 included in the range in which the pinned operation element 18 is displayed has been operated or the second region 20 has been operated. In a case in which it is determined that the first region 19 has been operated, the process proceeds to the next step S404. Conversely, in a case in which it is determined that the first region 19 has not been operated and the second region 20 has been operated, the process proceeds to step S410. The operation on the first region 19 and the second region 20 includes, for example, a single-tap operation.

In step S404, the CPU 101 of the image forming device 1 does not display the setting screen in which the stored setting is displayed on the display screen of the display unit 106 as illustrated in FIG. 4, and displays, as the execution switch 13, the single-tap switch 15 for executing the process by selecting (tapping) the execution switch 13 once. That is, as illustrated in FIG. 6, when "Execute now" is displayed as the execution switch 13 and the user executes a single tap of "Execute now," the function of the image forming device 1 to which the operation element in which the first region 19 is operated corresponds, for example, "Copy" is executed. Here, the single tap is an operation of executing a process of a function of the image forming device 1 by an operation of a shorter time than swiping. In FIG. 6, the list of history operation element 17 and pinned operation element 18 is grayed out, which indicates that "Execute now" which is execution switch 13 can be operated. Then, the process ends.

In step S410, as in the above-described first modified example, it is determined whether or not the setting is a single-tap operation. In a case in which it is determined that the setting is the single-tap operation, the process proceeds to the next step S411. In a case in which it is not determined that the setting is the single-tap operation, that is, in a case in which the setting is the swiping operation, the process proceeds to step S414.

In step S411, the setting screen is displayed on the display screen of the display unit 106. Then, the process proceeds to the next step S412.

In step S412, it is determined whether or not the setting has been changed by the user. In a case in which it is determined that the setting is not changed by the user, the process proceeds to the next step S413. In a case in which it is determined that the setting is changed by the user, the process proceeds to step S414.

In step S413, as illustrated in FIG. 8, the single-tap switch 15 is displayed on the display screen of the display unit 106. Here, in FIG. 8, for example, it is displayed that the "magnification" has been changed from "100%" to "two sheets→one sheet (N up)". Then, the process ends.

In step S414, as illustrated in FIG. 4, the setting screen is displayed on the display screen of the display unit 106, and the slide switch 14 is displayed. Then, the process ends.

Although the description has been given using the flowchart in which the two modified examples are adopted, only one of the modified examples may be adopted. In a case in which only the first modified example is adopted, steps S411 and S412 are omitted from the flowchart of FIG. 10, and the process proceeds to step S413 after step S410. In a case in which only the second modified example is adopted, step S410 is omitted from the flowchart of FIG. 7, and step S411 is executed after step S403.

Others

In addition, in each of the above-described embodiments, a processor is a processor in a broad sense, and includes a general-purpose processor (for example, a central processing unit (CPU) or the like) or a dedicated processor (for example, a graphics processing unit (GPU), an application specific integrated circuit (ASIC), a field programmable gate array (FPGA), a programmable logic device, and the like).

In addition, the operation of the processor in the above-described embodiment may be executed not only by one processor but also by cooperation of a plurality of processors existing at physically separated positions. The order of operations of the processor is not limited to the order described in each of the above-described embodiments, and may be appropriately changed.

The disclosure of Japanese Patent Application No. 2020-199120 filed on Nov. 30, 2020 is incorporated herein by reference in its entirety.

All documents, patent applications, and technical standards described in the present specification are incorporated herein by reference to the same extent as if each document, patent application, and technical standard were specifically and individually described to be incorporated by reference.

The invention claimed is:

1. An information processing device comprising a processor, wherein:

the processor displays, on a display device, an operation element that is configured to receive an instruction of a process involving a setting set by a user;

in a case in which a first region, included in a range in which the operation element is displayed, is operated, the processor switches, according to user-specific unique settings identified from user information, whether to execute the process by an operation of a shorter time, compared with a case in which a second region, that is a region different from the first region and included in the range in which the operation element is displayed, is operated, or to execute the process by an operation of a slide switch that takes more time to complete compared with the operation of a shorter time, which operation is performed by moving the operation element to a predetermined position and keeping the operation element pressed for a predetermined time or longer; and in a case in which the second region is operated, the processor switches, according to the user-specific unique settings, whether to execute the process by the operation of a shorter time or by the operation of the slide switch.

2. The information processing device according to claim 1, wherein an operation element displayed on the display device includes a history operation element displayed on the display device by executing the process in a setting related to the process.

3. The information processing device according to claim 1, wherein an operation element displayed on the display device includes a pinned operation element displayed on the display device that is pinned by an instruction from the user, to be distinguished from other history operation elements displayed on the display device from a list of history operation elements displayed on the display device, by executing the process in a setting related to the process.

4. The information processing device according to claim 3, wherein, in a case in which a range, in which the history operation element is displayed, is operated, a restriction is imposed so that the operation of the shorter time is not executable.

5. The information processing device according to claim 3, wherein, at a time of pinning, execution of an operation other than the operation of the shorter time even in a case in which the first region is operated, or execution of the operation of the shorter time even in a case in which the second region is operated, are able to be set by an operation of the user.

6. The information processing device according to claim 1, wherein an operation element displayed on the display device includes an operation element displayed on the display device by a setting operation of the user before the process is executed.

7. The information processing device according to claim 1, wherein, in a case in which the first region is operated by the user and the process is executed by the operation of the shorter time, a setting screen on which the setting of the process is changeable is not displayed on the display device.

8. The information processing device according to claim 1, wherein, even in a case in which the first region is operated, the process is executed by the operation of the case in which the second region has been operated, if the setting has been changed by a user operation on a setting screen on which the setting of the process is changeable, or on a setting screen that is different from the setting screen, before the process is executed by the operation of the shorter time.

9. A non-transitory computer-readable storage medium storing an information processing program causing a computer to function as the information processing device according to claim 1.

10. The information processing device according to claim 1, wherein, even in a case in which the second region is operated, when a setting is such that the process is to be executed by an operation of a shorter time compared with an operation on the slide switch, the processor executes the process in response to the operation of the shorter time being performed on the setting screen.

\* \* \* \* \*